United States Patent Office 3,704,301
Patented Nov. 28, 1972

3,704,301
4-(5-NITROFURYL)PYRIMIDINES
Herbert Berger, Mannheim-Kafertal, Rudi Gall, Grossachsen, Hartmut Merdes, Heidelberg, Kurt Stach, Mannheim-Waldhof, Wolfgang Voemel, Mannheim, and Winfriede Sauer, Mannheim-Wallstadt, Germany, assignors to Boehringer Mannheim G.m.b.H., Mannheim, Germany
No Drawing. Filed June 4, 1969, Ser. No. 830,489
Claims priority, application Germany, July 9, 1968,
P 17 70 831.5
Int. Cl. C07d 51/38
U.S. Cl. 260—251 R    6 Claims

ABSTRACT OF THE DISCLOSURE 5-nitrofuran derivatives and the physiologically acceptable salts thereof having the formula:

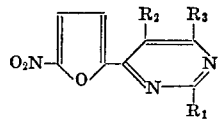

wherein $R_1$ and $R_2$ are each hydrogen, lower alkyl, alkoxy, amino or acylamino and $R_3$ is hydrogen, hydroxyl, lower alkoxy, amino or acylamino are characterized by marked antimicrobial activity and have been found to be particularly effective in the treatment of urinary tract infections.

---

The present invention relates to 5-nitrofuran derivatives, a process for preparing same and to therapeutic compositions made therewith.

According to the present invention there is provided a novel group of 5-nitrofuran derivatives having the formula:

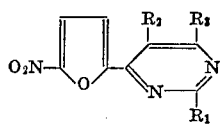

wherein $R_1$ and $R_2$, which can be the same or different, are each hydrogen, lower alkyl, alkoxy, amino or acylamino and $R_3$ is hydrogen, hydroxyl, lower alkoxy, amino or acylamino and the physiologically compatible salts thereof.

The compounds of Formula I in which $R_3$ is hydroxyl, can also be present in the tautomeric lactam form.

The novel 5-nitrofuran derivatives (I) according to the present invention are characterized by their marked antimicrobial activity, being outstandingly suitable for use in the treatment of infections of the urinary tract.

The 4-(5-nitro-2-furyl)-pyrimidine derivatives having Formula I which have proved to be particularly effective antimicrobial agents are those in which $R_1$ is amino, methyl or acetylamino, $R_2$ is hydrogen or methyl and $R_3$ is hydrogen, hydroxyl, amino or methoxy.

The novel 5-nitrofuran derivatives according to the present invention can be prepared, for example, by one of the following methods:

(a) nitration of a furan derivative of the formula:

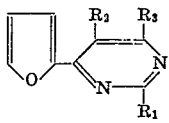

wherein $R_1$, $R_2$ and $R_3$ have the same significances as given above, and where $R_1$ and $R_3$ are to designate amino or $R_3$ is to designate hydroxyl, any acylamino or alkoxy groups which may be present are thereafter saponified; or (b) when $R_3$ is to designate hydroxyl, nitrofuran derivatives of the formula:

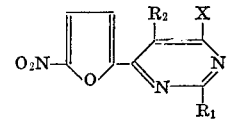

wherein $R_1$ and $R_2$ have the same significances as given above and X is chlorine or amino, are subjected to an acidic hydrolysis; or (c) when $R_3$ is to designate hydroxyl and $R_2$ is to designate hydrogen or lower alkyl, nitrofuran derivatives of the formula:

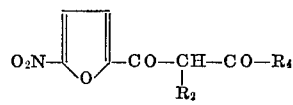

wherein $R_2$ is hydrogen, lower alkyl and $R_4$ is alkoxy, are condensed with an imidine having the formula:

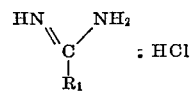

wherein $R_1$ is as above defined.

The nitration of the furan derivatives (II) is advantageously carried out with a nitration mixture of nitric acid, sulfuric acid and acetic anhydride. Amino groups, which are sensitive to oxidation, are thereby simultaneously acetylated and protected against attack by the nitric acid. After the nitration reaction has been completed, the N-acetyl groups can, if desired, be split off solvolytically, for example, with methanolic hydrochloric acid. A saponification of any alkoxy radicals which may be present can, if desired, be carried out in the conventional manner for example with a mixture of a hydrohalic acid, for example, hydrobromic acid, and glacial acetic acid. When the N-acetyl compounds are heated for a comparatively long period of time in strongly acidic solution, not only is the acetyl radical split off but the amino compound which is initially formed is hydrolyzed to the corresponding hydroxyl compound.

The condensation of the nitrofuran derivatives (IV) with the amidines (V) is preferably carried out in alcoholic alcoholate solution.

The furan derivatives (II) used as starting materials can be prepared, for example, by the condensation of an amidine having the Formula V with a compound of the formula:

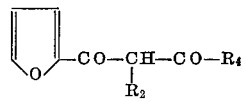

wherein $R_2$ has the same significance as given above, and $R_4$ is alkoxy. The condensation is preferably carried out in an alcoholic solution of an alkali metal alcoholate. There are thusly first obtained compounds having the Formula II, wherein $R_3$ is hydroxyl, which can then be reacted with an inorganic acid chloride, for example, phosphorus oxychloride, to give the corresponding chloro compound. The chlorine atom can then be easily replaced by a hydrogen atom by catalytic hydrogenation or by an amino group by reaction with ammonia or by an alkoxy radical by reaction with an alkali metal alcoholate.

The starting compounds (III) can be obtained by the nitration of those compounds (II) in which $R_3$ is halogen or amino.

As instances of physiologically compatible salts of the amino group substituted 4-(5-nitro-2-furyl)-pyrimidine derivatives (I), there may be mentioned the hydrochlorides, sulfates, phosphates, tartrates, citrates and oxalates, these salts being prepared by the conventional methods, for example, by neutralization with the appropriate acids.

The invention is more fully illustrated but is not limited by the following examples:

EXAMPLE 1

2-methyl-4-(5-nitro-2-furyl)-6-(1H)-pyrimidinone 2.3 g. 4-(2-furyl)-2-methyl-6(1H)-pyrimidinone were dissolved in 23 ml. concentrated sulfuric acid at 0° C. At the same temperature, there was slowly added in dropwise fashion, while stirring, a solution of 0.82 g. 100% nitric acid in 8 ml. concentrated sulfuric acid. Following the passage of one hour, the reaction mixture was poured onto ice, filtered with suction and the product obtained washed with ice water. After drying, there were obtained 1.5 g. (52% of theory) 2-methyl-4-(5-nitro-2-furyl)-6(1H)-pyrimidinone. The NMR and infra-red spectra confirmed the structure of the product, which, after recrystallization from dimethyl formamide, had a melting point of 305° C.

The 4-(2-furyl)-2-methyl-6(1H)-pyrimidinone used as starting material was obtained by the condensation of furoyl-acetic acid ethyl ester with acetamidine hydrochloride in the presence of sodium ethylate in ethanol; M.P. 285–290° C. (decomp.).

In an analogous manner, there was obtained 2,5-dimethyl-4-(5-nitro-2-furyl)-6(1H)-pyrimidinone in a yield of 42.5% of theory. After recrystallization from dimethyl formamide, the compound had a melting point of 315° C. The NMR and infra-red spectra confirmed the structure of the product.

As starting material, there was used 2,5-dimethyl-4-(2-furyl)-6(1H)-pyrimidinone (M.P. 272° C.) which had been obtained by the condensation of α-furoyl-propionic acid ethyl ester with acetamidine hydrochloride.

EXAMPLE 2

2-methyl-4-(5-nitro-2-furyl)-pyrimidine 3.5 g. 4-(2-furyl)-2-methyl-pyrimidine were suspended in 35 ml. acetic anhydride. A nitration mixture, consisting of 1.8 ml. 100% nitric acid, 35 ml. acetic anhydride and 35 ml. concentrated sulfuric acid, was added dropwise, while stirring, at −15° C. to the suspension. After stirring for one hour at −10° C., the reaction mixture was poured onto ice, neutralized and the precipitated crystals filtered off with suction. After washing and drying, there were obtained 2.3 g. (51% of theory) 2-methyl-4-(5-nitro-2-furyl)-pyrimidine. The NMR and infra-red spectra confirmed the structure of the product which, following recrystallization from ethanol/water, had a melting point of 164–167° C.

The 4-(2-furyl)-2-methyl-pyrimidine used as starting material was prepared by the following method: 4-(2-furyl)-2-methyl-6(1H)-pyrimidinone was reacted with phosphorus oxychloride to give 6-chloro-4-(2-furyl)-2-methyl-pyrimidine (M.P. 63–65° C.) which was then catalytically hydrogenated; (M.P. 47–50° C.).

The following compounds were obtained in an analogous manner:

2,5-dimethyl-4-(5-nitro-2-furyl)-pyrimidine

The yield of 2,5-dimethyl-4-(5-nitro-2-furyl)pyrimidine amounted to 46° of theory. After recrystallization from ethanol/water, the compound had a melting point of 134–136° C. The structure of the compound was confirmed by the NMR and infrared spectra.

The 2,5-dimethyl-4-(2-furyl)-pyrimidine used as starting material was prepared by the chlorination of 2,5-dimethyl-4-(2-furyl)-6(1H)-pyrimidinone with phosphorus oxychloride to give 6-chloro-2,5-dimethyl-4-(2-furyl)-pyrimidine (M.P. 100–103° C.), followed by catalytic hydrogenation thereof; (M.P. 77–80° C.).

6-methoxy-2-methyl-4-(5-nitro-2-furyl)-pyrimidine

The yield of 6-methoxy-2-methyl-4-(5-nitro-2-furyl) pyrimidine mounted to 65% of theory. After recrystallization from ethanol/water, the compound had a melting point of 152–154° C. The structure of the compound was confirmed by the NMR and infra-red spectra.

The 4-(2-furyl)-6-methoxy-2-methyl-pyrimidine used as starting material and which had a melting point of 56–58° C. was prepared by the reaction of 6-chloro-4-(2-furyl)-2-methyl-pyrimidine (M.P. 63–65° C.) with sodium methylate.

2,5-dimethyl-6-methoxy-4-(5-nitro-2-furyl)-pyrimidine

The yield of 2,5-dimethyl-6-methoxy-4-(5-nitro-2-furyl)-pyrimidine amounted to 60% of theory. After recrystallization from ethanol/water, the compound had a melting point of 143–145° C. The structure of the compound was confirmed by the NMR and infra-red spectra.

The 2,5-dimethyl-4-(2 - furyl) - 6 - methoxy-pyrimidine used as starting material, having a melting point of 82–84° C., was obtained by the reaction of 6-chloro-2,5-dimethyl-4-(2-furyl)-pyrimidine with sodium methylate.

6-amino-2,5-dimethyl-4-(5-nitro-2-furyl)-pyrimidine

The yield of 6-amino-2,5-dimethyl - 4-(5-nitro-2-furyl)-pyrimidine was 94% of theory. After recrystallization from dimethylformamide/water, the compound had a melting point of 176–181° C.

The 6-amino-2,5-dimethyl-4-(2-furyl)-pyrimidine used as starting material and which had a melting point of 144–149° C., was obtained by the reaction of 6-chloro-2,5-dimethyl-4-(2-furyl)-pyrimidine with concentrated aqueous ammonia solution in an autoclave.

6-amino-2-methyl-4-(5-nitro-2-furyl)-pyrimidine

The compound melted, with decomposition, at 278–279° C.

The 6-amino-2-methyl-4-(2-furyl)-pyrimidine used as starting material and which had a melting point of 122–125° C., was obtained by the reaction of 6-chloro-4-(2-furyl)-2-methyl-pyrimidine with concentrated aqueous ammonia solution in an autoclave.

2-acetamido-5-methyl-4-(5-nitro-2-furyl)-6(1H)-pyrimidinone

The yield of 2-acetamido-5-methyl-4-(5-nitro-2-furyl)-6(1H)-pyrimidinone was 82% of theory. After recrystallization from dimethyl formamide, the compound had a melting point of 305–307° C. The structure of the compound was confirmed by the NMR and infra-red spectra.

The 2 - acetamido-4-(2-furyl)-5-methyl-6(1H)-pyrimidinone use as starting material, which had a melting point of 265–268° C. was prepared by the acetylation of 2-amino - 4 - (2-furyl)-5-methyl-6(1H)-pyrimidinone.

EXAMPLE 3

2-amino-5-methyl-4-(5-nitro-2-furyl)-6(1H)-pyrimidinone 3.0 g. of the 2-acetamido-5-methyl-4-(5-nitro-2-furyl)-6(1H)-pyrimidinone which had been prepared by the procedure set out in Example 2 were boiled under reflux for 1 hour in 300 ml. methanol saturated with dry hydrogen chloride. The reaction mixture was then evaporated in a vacuum, the residue taken up with water, neutralized, filtered with suction and the product washed. After drying, there were recovered 2.5 g. (98% of theory) 2-amino - 5 - methyl-4-(5-nitro-2-furyl)-6(1H)-pyrimidinone, which had a melting point of 350° C. The structure of the compoound was confirmed by the NMR and infra-red spectra.

EXAMPLE 4

Using a method analogous to that which has been set out in Example 1, there was obtained 2-acetamido-4-(5-nitro-2-furyl) - 6(1H) - pyrimidinone in a yield amounting to 91% of theory. After recrystallization from dimethyl formamide, the compound melted, with decomposition, at 297–303° C. The structure of the compound was confirmed by the NMR and infra-red spectra.

The acetamido-4-(2-furyl)-6(1H)-pyrimidinone used as starting material which had a melting point of 293–295° C. was prepared by the acetylation of 2-amino-4-(2-furyl)-6(1H)-pyrimidinone.

EXAMPLE 5

Using a method analogous to that described in Example 1, there was obtained 2-amino-4-(5-nitro-2-furyl)-6(1H)-pyrimidinone in a yield of 84.5% of theory. Following recrystallization from dimethyl formamide/water, the compound melted, with decomposition, at 330–337° C.

EXAMPLE 6

By a method analogous to that set out in Example 2, there was obtained 2 - acetamido-4-(5-nitro-2-furyl)-pyrimidine in a yield of 21% of theory. After recrystallization from dimethyl formamide/water, the compound had a melting point of 232–235° C. The structure of the compound was confirmed by elementary analysis, as well as by the NMR and infra-red spectra.

The 2-acetamido-4-(2-furyl)-pyrimidine used as starting material, which had a melting point of 190–192° C. was obtained by the chlorination of 2-acetamido-4-(2-furyl)-6(1H)-pyrimidinone with phosphorus pentachloride whereby 2-acetamido-6-chloro-4-(2-furyl)-pyrimidine (M.P. 140–142° C.) was formed, followed by catalytic hydrogenation thereof.

EXAMPLE 7

2-acetamido-5-methyl-4-(5-nitro-2-furyl)-pyrimidine 1 g. 2-amino - 4 - (2-furyl)-5methyl-pyrimidine was heated for 15 minutes at 90° C. in 10 ml. acetic anhydride. After cooling to −15° C., there was slowly added dropwise at this temperature, while stirring, a nitration mixture which consisted of 0.48 ml. 100% nitric acid, 10 ml. acetic anhydride and 10 ml. concentrated sulfuric acid. The resulting reaction mixture was further worked up by a method analogous to that disclosed in Example 2. After recrystallization from dimethyl formamide/water, there was obtained 0.8 g. (53% of theory) 2-acetamido-5-methyl-4-(5-nitro-2-furyl)-pyrimidine, which had a melting point of 229–233° C. The structure of the compound was confirmed by the NMR and infrared spectra.

The 2-amino-4-(2-furyl)-5-methyl-pyrimidine used as starting material, which had a melting point of 168–172 C. was prepared by the chlorination of 2-amino-4-(2-furyl)-5-methyl-6(1H)-pyrimidinone with thionyl chloride in dimethyl formamide/chloroform to give 2-amino-6-chloro-4-(2-furyl)-5-methyl-pyrimidine (M.P. 170–172° C.), followed by catalytic hydrogenation thereof.

The bacteriostatic activity of the compounds in accordance with the invention was evaluated in vitro with respect to the organisms as set out in the following table.

The absolute bacteriostatic minimal concentration was determined for the following compounds of the invention and for two known or comparision compounds as hereinafter set out.

(A)—2-methyl-4-(5-nitro-2-furyl)-6(1H)-pyrimidinone
(B)—2,5-dimethyl-4-(5-nitro-2-furyl)-6(1H)-pyrimidinone
(C)—2-methyl-4-(5-nitro-2-fury)pyrimidine
(D)—2,5-dimethyl-4-(5-nitro-2-furyl)-pyrimidine
(E)—6-methoxy-2-methyl-4-(5-nitro-2-furyl)-pyrimidine
(F)—2,5-dimethyl-6-methoxy-4-(5-nitro-2-furyl)-pyrimidine
(G)—6-amino-2,5-dimethyl-4-(5-nitro-2-furyl)-pyrimidine
(H)—6-amino-2-methyl-4-(5-nitro-2-furyl)-pyrimidine
(I)—2-acetamido-5-methyl-4-(5-nitro-2-furyl)-6(1H)-pyrimidinone
(J)—2-amino-5-methyl-4-(5-nitro-2-furyl)-6(1H)-pyrimidinone
(K)—Furadantin-N-(5-nitro-2-furfurylidene)-1-aminohydantoin
(L)—6-(5-nitrofuryl-2)-uracil (DAS 1224 318)

The results are set out in the following table:

TABLE I.—BACTERIOSTATIC ACTIVITY IN VITRO

| Organism | Absolute bacteriostatic minimal concentration in µg./ml. | | | | | | | | | | | |
|---|---|---|---|---|---|---|---|---|---|---|---|---|
| | A | B | C | D | E | F | G | H | I | J | K | L |
| *Staphylococcus aureus* SG 511 | 2 | 1 | 4 | 4 | 1 | 2 | 2 | 1 | 0.125 | 0.125 | 4 | 16 |
| *Streptococcus pyogenes* Aronson | 4 | 1 | 8 | 2 | 2 | 2 | 2 | 4 | 0.125 | 0.125 | 4 | 4 |
| *Streptococcus faecalis* | 2 | 0.25 | 4 | 4 | 0.5 | 2 | 2 | 0.5 | 0.125 | 0.125 | 4 | 32 |
| *Escherichia coli* | 0.5 | 0.25 | 0.5 | 0.5 | 0.25 | 0.25 | 0.125 | 0.125 | 0.031 | 0.125 | 4 | 16 |
| *Proteus mirabilis* | 32 | 16 | 128 | 16 | 64 | >256 | 16 | 8 | 16 | [1] >16 | 128 | 128 |
| *Pseudomonas aeruginosa* | 8 | 16 | 32 | 32 | 32 | >128 | >32 | 32 | 16 | 8 | 128 | >128 |

[1] Compound very difficulty soluble, experimental series started at 16 µg./ml.

In addition, the following compounds were evaluated with respect to their bacteriostatic activity in urine of rats following oral administration. The results of these experiments are set out in Table II which follows:

TABLE II.—BACTERIOSTATIC ACTIVITY OF THE EXCRETED AMOUNT OF ACTIVE SUBSTANCE IN THE URINE OF RATS FOLLOWING ORAL ADMINISTRATION

| A | B | C | D | E | F | G | H | K | L |
|---|---|---|---|---|---|---|---|---|---|
| 1:143 | 1:30 | 1:14 | 1:21 | 1:12 | 1:40 | 1:100 | 1:14 | 1:19 | >1:2 |
| 1:133 | 1:22 | 1:16 | 1:28 | 1:15 | 1:37 | 1:203 | 1:39 | 1:21 | >1:2 |

NOTE.—Bacteriostatic maximum dilution of urine against *Escherichia coli* determined in 50 ml. urine samples 22 hours after 20 mg. test compound per kg. body weight had been orally administered. 2 rats were employed for each experiment and every value recorded in the table represents the results thereby obtained.

The acuteoral toxicity was determined in mice. The results are shown in Table III.

TABLE III

| Compound: | Mg./kg. |
|---|---|
| Furadantin [1] | $LD_{50}=250$ |
| Furadantin [2] | $LD_{50}=138$ |
| A | $LD_{50}=>1000$ |

[1] Published values 1964.
[2] Unpublished values 1968.

As can be seen from Table III, the toxicity of the compounds of the invention is lower than that of furadantin. While the bacteriostatic activity of both the known and novel compounds is quite similar, the novel compounds have a much better activity in vivo as compared to the known comparison compounds.

The compounds in accordance with the instant invention are antimicrobials and have been found to be bactericidal to the pathogens found in surface infections, gram negative as well as gram positive. They additionally have utility as agents for routine treatment of acute and chronic bacterial infections of the urinary tract, including those caused by Proteus ap. Further they lend themselves because of their properties to use in the prevention of treatment of mixed surface infections or wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof, as for instance, in the form of an 0.01 to 0.05% aqueous suspension or solution; in the form of solutions in non-aqueous, hygroscopic liquid vehicles such as polyethylene glycol, for instance, 0.1–0.5% solutions in polyethylene glycol; incorporation into a water-soluble ointment-like base (concentration 0.1–0.5%) or in a powder base composed for instance of water-soluble polyethylene glycols (concentration 0.1–0.5%); or in a form suitable for ingestion. Thus, a preferred form is a tablet containing 50–200 mg. of active compound. Depending on the condition, symptomatic and laboratory responses 100–400 mg. per day can be administered. Another preferred form for orally administering the compounds of the invention is in the form of a suspension thereof in a water miscible flavored gel. Such a gel can contain from 1 to 10 mg. of compound per cc.

We claim:
1. A 5-nitrofuran derivative having the formula:

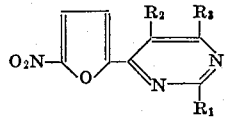

in which $R_1$ and $R_2$ each represent a member selected from the group consisting of hydrogen, methyl, amino and acetylamino and $R_3$ is a member selected from the group consisting of hydrogen, hydroxyl, methoxy, amino and acetylamino; and the physiologically acceptable salts thereof.

2. A compound according to claim 1 designated 2-methyl - 4 - (5 - nitro - 2 - furyl) - 6(1H) - pyrimidinone.

3. A compound according to claim 1 designated 6-amino - 2,5 - dimethyl - 4 - (5 - nitro - 2 - furyl)-pyrimidine.

4. A compound according to claim 1 designated 2-acetamido - 5 - methyl - 4 - (5 - nitro-2-furyl)-6(1H)-pyrimidinone.

5. A compound according to claim 1 designated 2-amino - 5 - methyl - 4 - (5 - nitro - 2 - furyl)-6(1H)-pyrimidinone.

6. A 5-nitrofuran derivative according to claim 1 wherein $R_1$ is a member selected from the group consisting of amino, methyl and acetylamino, $R_2$ is a member selected from the group consisting of hydrogen, and methyl, and $R_3$ is a member selected from the group consisting of hydrogen, hydroxyl, amino and methoxy.

References Cited
UNITED STATES PATENTS 3,096,332    7/1963    Von Esch et al. _____ 260—251

FOREIGN PATENTS 403,774    6/1966    Switzerland.

ALEX MAZEL, Primary Examiner
R. V. RUSH, Assistant Examiner

U.S. Cl. X.R.
260—256.4 C, 256.4 N, 347.4; 424—251

UNITED STATES PATENT OFFICE
CERTIFICATE OF CORRECTION

Patent No. 3,704,301   Dated November 28, 1972

Inventor(s) Herbert Berger et al

It is certified that error appears in the above-identified patent and that said Letters Patent are hereby corrected as shown below:

Col. 5, line 9 before "acetamido"

insert -- 2- --

Col. 6, line 55

Table II under the letter H

For "1:14"

Read -- 1:44 --

Col. 6, line 62

For "acuteoral"

Read -- acute oral --

Signed and sealed this 24th day of April 1973.

(SEAL)
Attest:

EDWARD M. FLETCHER, JR.
Attesting Officer

ROBERT GOTTSCHALK
Commissioner of Patents